Patented Aug. 14, 1934

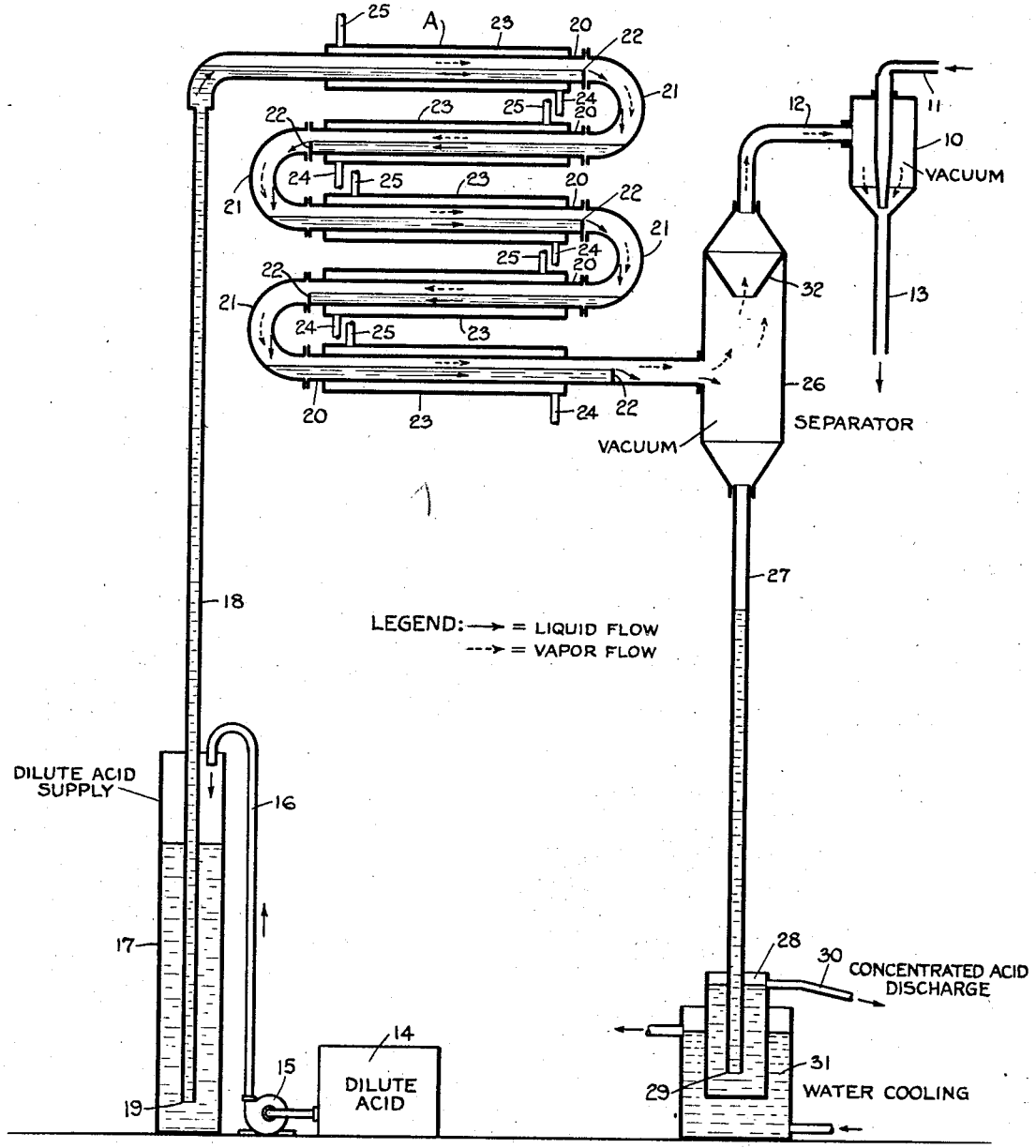

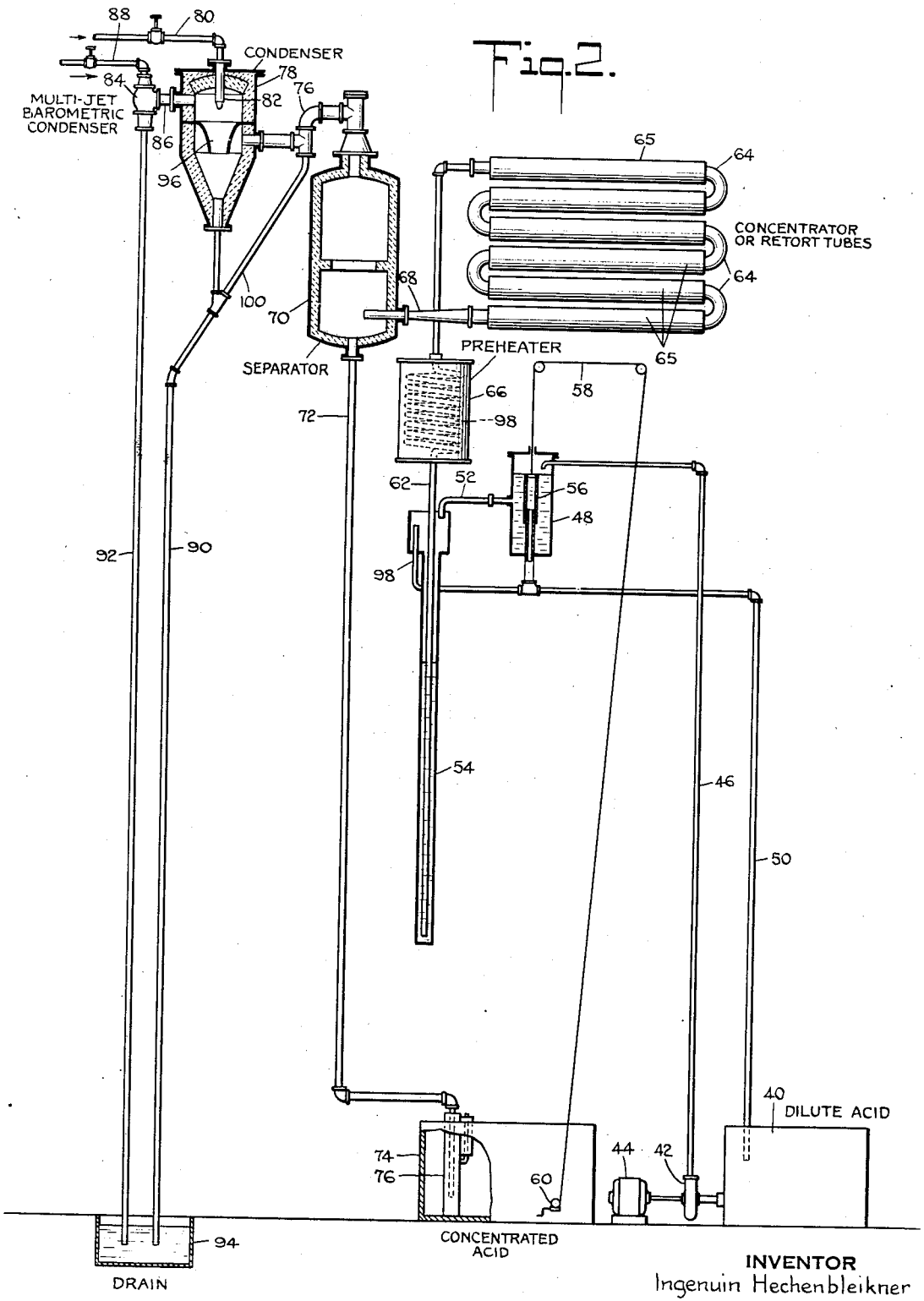

1,969,793

UNITED STATES PATENT OFFICE 1,969,793

CONCENTRATOR APPARATUS

Ingenuin Hechenbleikner, Charlotte, N. C., assignor to Chemical Construction Corporation, Charlotte, N. C., a corporation of Delaware Application August 10, 1931, Serial No. 556,151

18 Claims. (Cl. 23—274)

This invention relates to a method for concentrating dilute solutions of sulphuric acid, and to the apparatus employed in the method. The method is not claimed herein, being claimed in my copending application Serial No. 313,427, filed October 19th, 1928, of which the present application is partially a division and partially a continuation. While only the apparatus is claimed herein, the method as well as the apparatus are described, the method being of aid to understanding the apparatus.

The present invention has special reference to the concentration of sulphuric acid by external heat application or treatment. Prior methods of concentrating dilute solutions of sulphuric acid by utilizing external heating means therefor are attended with the objections involved in economic losses due to the corrosive action of the dilute solutions of sulphuric acid at boiling temperatures, the non-susceptibility of the process for continuous operation, and the undue amount of heat necessary as the process progresses and as the acid becomes more concentrated. The apparatus used in these prior methods is expensive due to the high thermal losses incident thereto, as well as to the costliness of vessels in which the concentrating process is practiced. Utilizing apparatus which resists the corrosive action of dilute solutions of hot sulphuric acid has not solved the problem, as corrosive resisting materials are not equally efficient in the conduction to the mass to be concentrated of the heat units applied externally. This prior method of distillation and concentration of the acid, due to local overheating, uneven distribution and variation of the concentration of the acid, has also rendered the process unsuitable for continuous operation and is moreover expensive by reason of the close supervision necessary to procure any degree of uniformity of the concentrated product.

The present invention centers about the provision of an improved process and apparatus for concentrating sulphuric acid, in which these objections incident to prior methods are successfully obviated and in which the process may be carried out continuously with economy both in operation and in the installation and upkeep costs of the apparatus employed. To accomplish this desideratum, the invention is characterized by continuously exposing solutions of sulphuric acid in small bodies and producing a continuous flow of said acid bodies in progressively concentrated form while at the same time producing a continuous flow of the aqueous vapors released from said bodies; and further characterized by the continuous exposing of the bodies of acid to heat under diminished pressure, thermal economy being effected by exposing the acid so treated in small bodies and in filamentary form with the source of diminished pressure serving simultaneously to induce a continuous flow of the acid being concentrated and of the vapors of the aqueous medium. A corollary object of the invention consists in continuously and progressively exposing dilute solutions of sulphuric acid to heat under diminished pressure, progressively subjecting the acid in various degrees of concentration to temperatures which will effect a high thermal economy and vaporization of the aqueous medium as the sulphuric acid progressively increases in concentration.

It is further contemplated by my invention to simultaneously heat sulphuric acid under a diminished pressure head and cause a continual flow of the dilute sulphuric acid solution, the agency inducing the flow of the sulphuric acid serving simultaneously to carry off the distilled vapors from the residuum which is progressively concentrated.

It is still further contemplated by my invention to concentrate sulphuric acid and separate the aqueous medium therefrom, the solutions being exposed to heating surfaces with maximum quiescence to permit a transference of heat for maximum thermal efficiency, yet capable of continuous operation, characterized by progressively cascading dilute solutions of sulphuric acid while heating the same and intermittently exposing the solutions so heated in filamentary form to diminished pressures and progressively drawing off the sulphuric acid as it is heated and concentrated, together with aqueous vapors distilled by the heating operation.

Other objects of my invention reside in the provision of apparatus for producing concentrated sulphuric acid including means to induce a flow of the dilute acid, the means so provided serving simultaneously to progressively expose small quantities of the material to heating elements and draw off the vapors distilled by the heating elements under diminished pressures.

A still further object of my invention resides in the provision of apparatus for concentrating sulphuric acid by exposing dilute solutions of sulphuric acid to heating elements under a diminished pressure head, having simplicity of construction and facility of assembly characterized by forming the heating elements of pipe sections having a high surface exposure and maximum capacity for flow by making the pipe sections large, thereby permitting ready heat transference from external sources and convenient release of the vapors generated by heating the solution of sulphuric acid.

The sulphuric acid to be concentrated is in some cases contaminated by a slight amount of nitric acid which, being volatile, goes off with the distilled vapor and has an injurious corrosive effect on the vacuum pump or jet condenser. Still another object of the present invention is to obviate this difficulty, and for this purpose I provide between the concentrator and the jet condenser, means preferably in the form of a stream of water for absorbing or eliminating acid fumes from the vapor leaving the concentrator.

One of the important advantages of the present high vacuum concentrator resides in the fact that it frequently makes it possible to use a steam supply anyway available for heating the retort tubes, instead of necessitating a special high pressure boiler. In some cases the already existent steam supply is of relatively low pressure, say, 100 pounds per square inch, and yet a high range of concentration is desired. These conditions can be met best by increasing the vacuum to the highest obtainable value, and accordingly another object of the present invention is to provide apparatus which will reduce the pressure in the system to a value of only one or two inches of mercury. This, I find, may be accomplished by employing a plurality of condensers arranged to act in series, and in most practical cases two such condensers are sufficient.

A still further object of the present invention is to combine the acid gas absorption apparatus with the condenser apparatus, and with this object in view I have devised a first condenser which is acid-proof in construction and which operates to eliminate the acid content of the distilled vapors. The second condenser may be a multi-jet barometric condenser of conventional commercial type designed to provide the major portion of the available vacuum and without necessitating precautions against acid attack and corrosion.

To the accomplishment of the foregoing and such other objects as will hereinafter appear or be pointed out, my invention consists in the apparatus and elements thereof and the relation of one to the other as hereinafter are more particularly described in the specification and sought to be defined in the claims. The specification is accompanied by drawings which show the preferred embodiments of my invention, and in which:

Fig. 1 is a sectional elevation of one form of apparatus which may be conveniently used in the practice of my process; and Fig. 2 is an improved and preferred modification.

Referring now more in detail to the drawings, one form of apparatus which may be used in the practice of the process is shown in Fig. 1 and comprises a concentrator generally designated as A, controlled by an ejector 10, the ejector 10 being preferably operated by a fluid agent such as water flowing through the line 11 in the direction indicated by the arrow to produce a diminished pressure head in the line 12 which is transmitted to the concentrator A. The fluid agent in the pipe line 11 is permitted to escape through the pipe line 13. The diminished pressure head thus generated in the pipe line 12 serves to draw into the concentrator A the weak sulphuric acid to be concentrated, and this is delivered to the concentrator from a boot or vessel 17 through a feed pipe 18. The weak acid is in turn delivered to the vessel 17 from a storage tank 14 by means of a suitable pumping device such as 15. The feed line 18 has its lower or free end 19 disposed adjacent the bottom of the boot or vessel 17 so as to assure that the sulphuric acid in the vessel at all times maintains the feed line 18 sealed. The depth of the acid in the boot 17 and the length of the pipe line 18 are so selected and arranged with reference to the specific gravity of the weak acid to be handled, that the vacuum or diminished pressure head in the line 12 is able to maintain a constant flow of acid up the feed line 18 and through the concentrator A.

The diminished pressure head generated in the line 12 serves to drive or feed the sulphuric acid to be concentrated through the line 18; and this acid is fed to a series of retorts 20 which are in the form of elongated pipes, preferably vertically disposed above each other and interconnected serially by the elbows 21. The retorts or pipe sections 20 are arranged to have a vapor clearance portion as well as liquid retaining portions, and for this purpose I maintain the pipe sections 20 only partly full by providing the overflow dams 22 about half-way diametrically of the pipe sections at the exit ends thereof. The vacuum in the pipe line 12 is so maintained and the length of the pipe 18 is so arranged with reference to the specific gravity of the weak acid to be handled, that there is maintained as aforesaid a constant flow of acid through the line 18 and through the liquid retaining portions of the retorts or pipe sections 20 defined by the overflow dams 22, leaving free vapor clearance portions above the acid levels in the pipe sections and in the elbows 21.

For heating the pipe sections of the concentrator, the retorts or pipe sections 20 are surrounded with jackets 23, each jacket having an inlet pipe 24 and an outlet pipe 25. The inlet pipes 24 and the outlet pipes 25 may be connected in parallel or series, each with advantages as will be pointed out as this description proceeds. The heating medium through the jackets 23 may either be steam or a liquid medium such as hot oil; and a temperature is maintained in relation to the vacuum so that evaporation of the water component of the acid takes place considerably below the boiling point of the acid. It will be understood that as the sulphuric acid gravitatingly moves from the uppermost retort 20 to the lowermost one, it will be progressively heated to drive off the water component, and that the flow induced by the vacuum or diminished pressure head serves to draw off the vapors generated and emitted in the upper half or vapor clearance portions of each retort.

The concentrated acid will be obtained from the lowermost retort and will overflow the lowermost dam 22 into a separator 26. Here, the liquid sulphuric acid is conducted downwardly through the pipe line 27 into a vessel 28, the pipe line 27 having its opening 29 well below the normal level of the fluid in the vessel 28, from which vessel the concentrated sulphuric acid is drawn off by the line 30. It will be observed that the pipe line 27 is thereby maintained sealed; and the length of the pipe 27 is such, depending upon the specific gravity of the concentrated acid, as to always maintain the vacuum within the separator 26. It will be understood that the vessel 28 may be suitably cooled; and for this purpose the vessel 28 is inserted within a water cooled jacket 31, and thereby the acid from the pipe line 30 is delivered in a cooled condition to storage tanks or other collecting receptacles. The water distilled from the dilute sulphuric acid and exiting from the lowermost retort 20 is drawn off upwardly through the pipe line 12. It is preferred to interpose between the pipe line 12 and the lowermost retort 20 the baffle plates 32, thereby preventing any acid mechanically carried by the vapors from being drawn into the ejector and over with the water or similar fluid used for operating the same. The water vapors distilled will condense in the ejector 10, thereby promoting the vacuum in the system, and be carried off through the pipe line 13. The acid flow in the apparatus is shown by the full lined arrows, and the vapor flow by the dotted lined arrows.

The retorts 20 are preferably made of acidproof iron, such as iron-containing silicon, known to the trade as Duriron, Corrosiron and Tantiron. It will be understood, however, that as the dilute sulphuric acid is heated substantially below the boiling point, minimum corrosive action will thereby be obtained.

In addition to the feature of the process involved in heating the sulphuric acid under diminished pressures, it will be observed that in the process of this invention the sulphuric acid while under heating treatment is disposed to have an optimum evaporative surface. This is accomplished by making the retorts 20 relatively long and producing small quiescent bodies of acid, so that the acid bodies come into quick contact with the heating surfaces before any substantial loss of temperature occurs and by cascading or spilling the acid over the inner portions of the elbows 21 so as to subject the same to a filamentary condition which readily permits the release from the acid of entrapped vapors. This process continues through the series of retorts alternately and successively, causing a quick evaporation of the water and rapid concentration of the acid.

It will be further observed that I induce the flow of the sulphuric acid to the apparatus with the minimum diminished pressure head, and that at the same time by reason of the large evaporative surfaces intercommunicated as described, I readily draw off the vapors as generated. It will be further evident that by the process provided I may adjust the heat within the retorts 20 so as to avoid local overheating by having the inlet and outlet of each retort progressively downwardly connected with heating fluids at increased temperatures, thereby avoiding any mechanical carrying over of acid into the vapor phase, and accomplishing distillation of the water at minimum temperatures.

It will be evident that the inlets 24 of the series of retorts may be connected to a common source of heat at substantially the same temperature and obtain a high thermal efficiency. As the sulphuric acid flows from the uppermost retort, it is exposed to a larger number of heating units and the temperature of the acid as it is concentrated is thereby progressively raised to more efficiently distill the aqueous diluent. I may, however, serially connect the heating elements so that the highest temperature steam is admitted at the lowermost inlet 24 and the steam finally emitted from the highest outlet 25, there being a counter-current flow of heating fluid to the flow of the sulphuric acid within the retorts. In this form of construction, the drop in temperature, consequent to passing heating fluid serially through the stacked number of retorts will be in favor of presenting the highest temperature of the fluid to the most concentrated acid and the lowest temperature to the most dilute acid.

Although I have described my process of treating the acid by progressively gravitating it through the series of retorts from top to bottom, maintaining it quiescent within the dammed portion of the retorts, and providing a vapor space above the acid in each retort, the process may be reversed for certain purposes, as for the treatment of very dirty acids, the flow of the dilute acid being reversed to begin with the bottom retort, progress upwardly and be drawn off from the top retort. Under these conditions, it is deemed advisable to omit the overflow dams 22 from all but the top section, leaving the vapor area above only the last heating stage. In this form of device the vacuum serves to cause a flow of the acid, and the temperature of the acid is progressively increased until it reaches the last and uppermost pipe section and is thereby presented within the vapor space, at which point the vapors are immediately released and drawn off.

In my arrangement the heating and interconnecting zones are fully enclosed, and the system is operated under greatly reduced pressure. In actual practice the various joints in the piping are carefully constructed to withstand a high vacuum, and the operation of the jet condensers 10 and 11 succeeds in creating a desired high vacuum. The concentrator tubes are located high above ground level, and the risers or pipes 18 and 27 are long in order to provide a seal against the high vacuum. While using only a moderate water supply the pressure in the system may readily be reduced to a value of, say, three inches of mercury, and this effect is largely due to the condensing action of the water jet when the vapors generated within the system are brought into contact with the jet. This operation under high vacuum is entirely different from a simple removal of fumes under a slight suction intended merely to overcome pipe friction and insure the removal of the fumes. Because of the low pressure operation, the jackets may be heated with relatively low pressure steam and yet a high strength of acid may readily be obtained. The pipe retort system is relatively inexpensive to build and is capable of withstanding a high vacuum. The operation of the method and apparatus is continuous and not in batches, and permits of a wide range of concentration, that is, the concentration may be directly from a relatively dilute acid to a relatively highly concentrated acid while subjecting the same to only a single treatment and despite the fact that that treatment is a continuous one.

Attention is next directed to Fig. 2 of the drawings, showing a concentrator generally similar to that illustrated and described in connection with Fig. 1, but improved in respect of certain details which are considered in the following description.

The dilute acid to be concentrated is contained in a storage tank 40 and is circulated by means of a pump 42, driven by a motor 44, upwardly through feed pipe 46 to a constant level tank 48, and back to tank 40 through a discharge pipe 50. The liquid contained in constant level tank 48 flows outwardly through nozzle 52 into an acid feed boot 54. The rate of feed of the dilute acid into boot 54 is readily controlled by varying the acid level in tank 48, which in turn may be accomplished by adjusting the height of overflow sleeve 56, as by means of cable 58 and winch mechanism 60.

The liquid in boot 54 is drawn upwardly through a feed pipe 62 and then flows into the concentrator or retort tubes 64. A preheater 66 for the dilute acid may be inserted between the feed boot 54 and the concentrator tubes 64.

The retort tubes 64 are preferably like those described in connection with Fig. 1, and are jacketed by jackets 65 for heating by suitable means, as hot oil, or, more preferably, steam. Each of the tubes is provided at its discharge end with means preferably in the form of a dam for obstructing and retaining in the tube a shallow body of the liquid to be concentrated, just as was explained in connection with Fig. 1.

From the outlet or discharge end of the concentrator the distilled vapor and residual liquid both pass through pipe 68 into a separator 70, the operation of which has already been explained, and which permits the concentrated acid to flow downwardly through a drain pipe 72 into a storage tank 74 for the concentrated acid. The distilled vapor, on the other hand, flows upwardly through the separator and then passes through interconnecting pipes 76 to a first condenser 78 which is preferably of the jet type operated by means of water supplied through pipe 80 and discharged from nozzle or jet 82. A second condenser 84, which is preferably a multi-jet barometric condenser, is connected in series with condenser 78 by means of a pipe 86. Condenser 84 is operated by means of water supplied through pipe 88. The discharge from condensers 78 and 84 flows downwardly through discharge pipes 90 and 92 respectively, into a water seal drain 94.

As was previously explained, the evolved or distilled vapor is water or steam, and condensation of this vapor by the condensers results in the production and maintenance of a high vacuum which in turn very greatly reduces the temperature, and consequently the steam pressure if steam is used, needed for the concentrator tubes. Great heat economy for a given rate of production is obtained, or conversely the production may be increased for a given amount of heat.

All material coming in direct contact with the acid must, of course, be made acid-proof. The separator 70 must also be made acid-proof and preferably is lined with protective layers of lead and acid-proof masonry. Theoretically the condenser need not be made acid-proof because it comes in contact only with the distilled vapor, whereas the acid is separated in separator 70. When dealing with sulphuric acid the boiling point is so high even at exceedingly low absolute pressures, that there is little danger of acid corrosion in the condenser. However, in commercial practice the sulphuric acid to be concentrated is frequently contaminated by small amounts of nitric acid or other corrosive substance. Nitric acid in particular is highly volatile and corrosive and will pass with the vapor into the condenser and attack the same. Accordingly, if the condenser is not acid-proof it is desirable to preliminarily remove the nitric acid, and considered in one aspect the first condenser, that is condenser 78, may be considered as a device designed and installed for removal of nitric acid fumes. With this object in view the condenser 78 is made of acid-proof metal and is lined with acid-proof masonry. The deflecting shield 96 within the condenser is also acid-proof and may be made, for example, of lead. The discharge of water through nozzle 82 absorbs and carries with it the nitric acid content of the distilled vapor. At the same time it is preferred to design the absorption apparatus 78 in the form of a jet condenser as shown, in order that the same may also function to increase the total vacuum obtainable within the concentration system.

The condenser 84 is preferably a multi-jet barometric condenser of well known and conventional type. Such condensers are commercially available and therefore need not be described in detail herein. Because of the use of the intermediate absorption apparatus 78, the condenser 84 need not be acid-proof in construction. However, as a matter of caution it is preferred to make the same of acid-resisting metal.

The acid preheater 66 comprises a coil of pipe 98 substantially filling and being jacketed by the preheater casing 66. The latter may be filled with any preferred heating medium, such as steam, but may more economically be supplied with the condensate from the steam jackets 65. The piping and steam traps for the steam jackets 65 and preheater 66 have not been shown because, as was previously explained, the same may be arranged in many different ways. The jackets and preheater may all be connected in parallel or may all be connected in series. More preferably the jackets 65 are connected in parallel or in series and the condensate therefrom is fed to a steam trap the liquid discharged from which is supplied to preheater 66. If desired the jackets of the several tubes or groups of the same may be supplied with steam of different pressure and temperature, in which case the condensate is brought to separate steam traps, from all of which it may be led to preheater 66.

The apparatus is preferably elevated a substantial distance above ground level or above the storage tanks, feed boot, etc., in order that the pipes interconnecting the same may be used to obtain a liquid or barometric seal against the high vacuum caused by the condensers. All drain or discharge pipes should be arranged with the discharge end of the same immersed in a tank or boot of liquid so as to provide the desired seal. Intake pipe 62, for example, is surrounded by the relatively long boot 54. The latter is made of sufficient length and volumetric capacity to take care, on the one hand, of liquid discharged from pipe 62 should the vacuum be broken, and any overflow in such event may be taken care of by overflow pipe 98 connected to discharge pipe 50. If, on the other hand, the vacuum should temporarily be increased above its normal value, the liquid remaining in boot 54 is ample to preserve the desired seal. The drain or discharge pipe 72 for the concentrated acid is brought well down into tank 74 so as to preserve the desired liquid seal, and more preferably may be surrounded by a boot 76 which serves to preserve the desired liquid seal even when tank 74 is drained. The discharge pipes 90 and 92 from the jet condensers terminate in a drain 94 the liquid in which surrounds the foot of the pipes in order to seal the system at this point.

A pipe branch 100 may, if desired, be connected between the separator outlet and the discharge from condenser 78, as shown in the drawings. This pipe permits any preliminarily condensed vapor leaving the separator to drain directly into discharge pipe 90. It also acts to prevent undesired flooding of the apparatus in the event of unexpected surges in water pressure or other factor entering into the operation of the system.

It may be well to emphasize at this point the exceedingly low pressures obtainable in the present system and the consequent low steam pressure by which the same may be operated. In a specific instance the apparatus has been used to concentrate 65% sulphuric acid to 85% sulphuric acid at high output while heating the concentrator tubes with steam under a pressure of only 115 pounds per square inch, this low pressure being utilizable because of the maintenance within the concentrator system of an absolute pressure of only one and a fraction inches of mercury. It will be appreciated that when steam of higher pressure is available the vacuum under which the apparatus is operated may, if desired, be lessened with a consequent saving in cooling water or condenser water supply. In such case it may be preferred to use only one jet condenser, as shown in Fig. 1, instead of the two condensers, as shown in Fig. 2; or, if preferred, maximum vacuum may be maintained and the capacity or rate of feed of acid through the system commensurately increased.

The mode of constructing and using the apparatus of my invention and the many advantages thereof, will, it is thought, be apparent from the foregoing description. The apparatus operates continuously and automatically, and requires practically no attention in its operation. Steam having a wide range of pressure may be utilized so that the conditions at any particular plant may readily be accommodated. The capacity of the system may be adjusted over wide ranges by cutting down the steam supplied to the system and, if necessary, by varying the vacuum maintained therein. The system is characterized by extremely efficient heat transfer because of the nature of the retort tubes used, the rapid flow of acid therethrough, and because the conditions of acid strength and temperature in the successive tubes may be adjusted to attain, and in fact tend to naturally attain without adjustment, an increase which is gradual and ideal for the purpose during the passage of the acid through the successive tubes.

There is a minimum of acid-proof surface or area in contact with acid. The low boiling point or temperature reduces corrosive effects. There is no deposit of impurities on the evaporating surfaces because of the rapid flow of the acid and the continuous boiling of the same, and consequently the apparatus may be successfully used for clean or for highly contaminated acid. There similarly is no foaming trouble inasmuch as the acid flows rapidly through and changes in concentration in the successive stages of the concentrator unit. The vapors are mechanically separated from the heated acid or liquid medium as soon as formed. The pipe retort system shown provides an excellent relationship between heating surface and liquid content. The distilled water vapor is not carried away from the acid immediately, but passes through the successive tubes and permits acid mechanically entrapped in the vapor to be redeposited. The system is consequently characterized by high efficiency and high yield. The apparatus considered mechanically is not subject to expansion troubles, and comprises relatively few and for the most part interchangeable parts.

The apparatus is, of course, applicable to many acids and corrosive liquids other than the sulphuric acid specifically mentioned, and may be used to concentrate phosphoric acid and to concentrate various salt solutions. The apparatus is capable of handling widely varying strengths of acid and will concentrate sulphuric acid, for example, up to a strength of 66° Baumé starting from almost any initial strength, and this may be accomplished even when the steam pressure available is relatively low, simply by maintaining a very high vacuum within the system. The desired high vacuum may be maintained with a relatively low water consumption. Acid containing a volatile corrosive impurity such as nitric acid may be handled by the system, the impurity being removed ahead of the condenser or the condenser being made acid-proof, and, if desired, the means for removing and absorbing the nitric acid vapor may itself be made to act as a condenser for improving the vacuum within the system.

It will be apparent that while I have shown and described the invention in preferred forms, many changes and modifications may be made in the structures disclosed, without departing from the spirit of the invention, defined in the following claims.

I claim:

1. Vacuum concentrator apparatus comprising a bank of concentrator or retort tubes, means to heat the same, means to obstruct and retain a shallow body of the liquid to be concentrated in each of the tubes, a storage tank for the liquid to be concentrated connected to the inlet of the concentrator, a separator connected to the outlet of the concentrator, a storage tank for the concentrated liquid connected to the separator, and a water jet condenser connected to the separator in order to withdraw evaporated vapor from the separator and concentrator and to create a high vacuum within the same by condensing the vapor.

2. Vacuum concentrator apparatus for concentrating a water diluted substance, comprising a concentrator, means to heat the same, a storage tank for the liquid to be concentrated connected to the inlet of the concentrator, a storage tank for the concentrated liquid leaving the concentrator, means for separating vapors from concentrated liquid, and a water jet condenser connected to the concentrator in order to withdraw evaporated vapor therefrom and to creat a high vacuum therein by condensing the vapor, said concentrator and jet condenser being elevated a substantial distance above the aforesaid storage tanks so that the pipes interconnecting the same may be used for a liquid seal against the high vacuum created by the jet condenser.

3. Vacuum concentrator apparatus for concentrating a water diluted substance, comprising a bank of concentrator or retort tubes, means to heat the same, a storage tank for the liquid to be concentrated connected to the inlet of the concentrator, a separator connected to the outlet of the concentrator, a storage tank for the concentrated liquid connected to the separator, and a water jet condenser connected to the separator in order to withdraw evaporated vapor from the separator and concentrator and to create a high vacuum within the same by condensing the vapor, said concentrator, separator, and water jet condenser being elevated a substantial distance above the aforesaid storage tanks so that the pipes interconnecting the same may be used for a barometric seal against the high vacuum created by the jet condenser.

4. Vacuum acid concentrator apparatus comprising a concentrator, means to heat the same, a supply pipe for the dilute acid to be concentrated connected to the inlet of the concentrator, a storage tank for the concentrated acid connected to the outlet of the concentrator, means for separating vapors from concentrated liquid, water jet or spray means following the concentrator for contacting with and absorbing and disposing of any acid fumes in the distilled water vapor, and a condenser following the said water jet or spray means for condensing the distilled vapor from the concentrator in order to create and maintain a high vacuum within the system.

5. Vacuum acid concentrator apparatus comprising a concentrator, means to heat the same, a supply pipe for the dilute acid to be concentrated connected to the inlet of the concentrator, a storage tank for the concentrated acid connected to the outlet of the concentrator, means for separating vapors from concentrated liquid, an acid-proof first condenser connected to the concentrator, and a second condenser connected in series with the first condenser, said condensers operating together to withdraw distilled vapor from the concentrator and to condense the same, thereby creating and maintaining a high vacuum within the system.

6. Vacuum acid concentrator apparatus comprising a concentrator, means to heat the same, a supply pipe for the dilute acid to be concentrated connected to the inlet of the concentrator, a storage tank for the concentrated acid connected to the outlet of the concentrator, means for separating vapors from concentrated liquid, an acid-proof condenser connected to the concentrator, and a water jet condenser connected to the first condenser, said condensers operating together to withdraw distilled vapor from the concentrator and to condense the same, thereby creating and maintaining a high vacuum within the system.

7. Vacuum acid concentrator apparatus comprising a concentrator, means to heat the same, a supply pipe for the dilute acid to be concentrated connected to the inlet of the concentrator, a storage tank for the concentrated acid connected to the outlet of the concentrator, means for separating vapors from concentrated liquid, an acid-proof water jet condenser connected to the concentrator, and a second condenser connected to the first condenser, said condensers operating together to withdraw distilled vapor from the concentrator and to condense the same, thereby creating and maintaining a high vacuum within the system.

8. Continuous flow vacuum acid concentrator apparatus comprising a concentrator, means to heat the same, a supply pipe for the dilute acid to be concentrated connected to the inlet of the concentrator, a separator connected to the outlet of the concentrator, a storage tank for the concentrated acid connected to the separator, an acid-proof first water jet condenser connected to the separator, and a second water jet condenser connected in series with the first condenser, said condensers operating together to withdraw distilled vapor from the separator and concentrator and to condense the same, thereby creating and maintaining a high vacuum within the system.

9. Continuous flow vacuum concentrator apparatus comprising a bank of generally superposed heat jacketed concentrator or retort tubes connected in series and each provided at its outlet end with means for obstructing and retaining therein a shallow body of liquid to be concentrated, a storage tank for the liquid to be concentrated, means connecting the same to the top tube of the concentrator, a separator connected to the bottom tube of the concentrator, a storage tank for the concentrated liquid connected to the separator, a first water jet condenser connected to the separator, a second water jet condenser connected in series with the first condenser, said condensers operating together to withdraw distilled vapor from the separator and concentrator and to condense the same, thereby creating and maintaining a high vacuum within the system.

10. Continuous flow vacuum acid concentrator apparatus comprising a bank of generally superposed steam jacketed concentrator or retort tubes connected in series and each provided at its outlet end with a dam for obstructing and retaining therein a shallow body of liquid to be concentrated, a storage tank for the liquid to be concentrated, a preheater connected between said tank and the top tube of the concentrator, a separator connected to the bottom tube of the concentrator, a storage tank for the concentrated acid connected to the separator, an acid-proof water jet condenser connected to the separator, a multi-jet barometric condenser connected in series with the first condenser, said condensers operating together to withdraw distilled vapor from the separator and concentrator and to condense the same, thereby creating and maintaining a high vacuum within the system.

11. Continuous flow vacuum concentrator apparatus comprising a concentrator, means to heat the same, a storage tank for the liquid to be concentrated connected to the inlet of the concentrator, a separator connected to the outlet of the concentrator, a storage tank for the concentrated liquid connected to the separator, a first water jet condenser connected to the separator, and a second water jet condenser connected to the first condenser, said condensers operating to withdraw distilled vapor from the separator and concentrator and to condense the same, thereby creating and maintaining a high vacuum within the system, said concentrator, separator, and water jet condensers all being elevated a substantial distance above the aforesaid storage tanks so that the pipes interconnecting the same may be used for a liquid seal against the high vacuum created by the jet condensers.

12. Continuous flow vacuum concentrator apparatus comprising a bank of generally superposed heat jacketed concentrator or retort tubes connected in series and each provided at its outlet end with means for obstructing and retaining therein a shallow body of liquid to be concentrated, a storage tank for the liquid to be concentrated connected to the top tube of the concentrator, a separator connected to the bottom tube of the concentrator, a storage tank for the concentrated liquid connected to the separator, and a water jet condenser connected to the separator, said condenser operating to withdraw distilled vapor from the separator and concentrator and to condense the same, thereby creating and maintaining a high vacuum within the system, said bank of concentrator tubes, said separator, and said jet condenser all being elevated a substantial distance above the aforesaid storage tanks so that the pipes interconnecting the same may be used for a barometric seal against the high vacuum created by the jet condenser.

13. Continuous flow vacuum acid concentrator apparatus comprising a bank of generally superposed heat jacketed concentrator or retort tubes connected in series and each provided at its outlet end with means for obstructing and retaining therein a shallow body of liquid to be concentrated, a storage tank for the liquid to be concentrated connected to the top tube of the concentrator, a separator connected to the bottom tube of the concentrator, a storage tank for the concentrated acid connected to the separator, an acid-proof water jet condenser connected to the separator, and a second water jet condenser connected to the first condenser, said condensers operating together to withdraw distilled vapor from the separator and concentrator and to condense the same, thereby creating and maintaining a high vacuum within the system, said concentrator, separator, and jet condensers all being elevated a substantial distance above the aforesaid storage tanks so that the pipes interconnecting the same may be used for a barometric seal against the high vacuum created by the jet condensers.

14. Apparatus for concentrating aqueous solutions of sulphuric acid by withdrawal of the water component in vaporous form, comprising a plurality of retort chambers, means for connecting said chambers in cascade for liquid flow downwardly in one direction substantially continuously, dams in said retorts for maintaining vapor spaces continuously connected, and evacuating means to induce a flow of acid through said chambers and a flow of vapors through said spaces continuously and in the same direction downwardly, said last-mentioned means being connected to the lowermost chamber and serving to maintain the acid at diminished pressures in all of the chambers.

15. Concentrating apparatus comprising a plurality of elevated retort chambers, means for connecting said chambers in cascade for liquid flow downwardly in one direction substantially continuously, dams in said retorts for obstructing and retaining shallow bodies of liquid therein and for maintaining connected vapor spaces thereabove, and evacuating means connected to the lowermost retort chamber for inducing a flow of acid serially through said chambers and a flow of vapors serially through said spaces in the same direction as the flow of the acid.

16. Concentrating apparatus comprising a plurality of retort chambers, means for connecting said chambers in cascade for liquid flow downwardly in one direction substantially continuously, and dams in said retorts for obstructing and retaining shallow bodies of liquid therein and for maintaining a vapor space continuously connected, evacuating means connected to the lowermost retort for inducing a flow of acid and vapor through said retorts, and a separator interposed between said lowermost chamber and said evacuating means.

17. An apparatus for concentrating aqueous solutions of sulphuric acid which includes, in combination, a series of retort chambers connected in cascade for continuous flow of liquid downwardly therethrough, dams in said chambers for maintaining a continuous vapor space and for obstructing and retaining shallow bodies of liquid therein and for maintaining portions of the acid to be treated substantially quiescent in contact with external heating means for said retort chambers, acid inlet means connected to the uppermost chamber, acid outlet means including an aqueous vapor separator associated therewith connected to the lowermost chamber, and evacuating means connected to said separator for causing a concurrent flow of liquid and vapor through said retort chambers to the separator and for keeping the retort chambers under greatly reduced pressure.

18. Continuous flow vacuum concentrator apparatus comprising a bank of generally superposed heat jacketed concentrator or retort tubes connected in series and at least one of which is provided at its outlet end with means for obstructing and retaining therein a shallow body of liquid to be concentrated, a storage tank for the liquid to be concentrated connected to one end of the concentrator, a separator connected to the other end tube of the concentrator, a storage tank for the concentrated liquid connected to the separator, and a water jet condenser connected to the separator, said condenser operating to withdraw distilled vapor from the separator and concentrator and to condense the same, thereby creating and maintaining a high vacuum within the system, said bank of concentrator tubes, said separator, and said jet condenser all being elevated a substantial distance above the aforesaid storage tanks so that the pipes interconnecting the same may be used for a barometric seal against the high vacuum created by the jet condenser.

INGENUIN HECHENBLEIKNER.